United States Patent [19]
Kroll et al.

[11] Patent Number: 6,166,147
[45] Date of Patent: Dec. 26, 2000

[54] PRESSURE SENSITIVE ADHESIVE COMPRISING SATURATED BACKBONE HAVING SIDE CHAINS

[75] Inventors: Mark S. Kroll, Arden Hills; Carolyn A. Fischer, Stillwater, both of Minn.

[73] Assignee: H. B. Fuller Licensing & Financing Inc., St. Paul, Minn.

[21] Appl. No.: 08/948,563

[22] Filed: Oct. 10, 1997

[51] Int. Cl.[7] .............................. C08F 293/00; C08K 5/00
[52] U.S. Cl. ......................... 525/314; 524/534; 604/358
[58] Field of Search .................................. 525/314, 321, 525/319, 323; 524/534

[56] References Cited

U.S. PATENT DOCUMENTS

| | | | |
|---|---|---|---|
| 5,090,861 | 2/1992 | Malcom ..................................... | 412/37 |
| 5,393,841 | 2/1995 | Himes et al. ........................... | 525/314 |
| 5,750,607 | 5/1998 | Gerard ..................................... | 524/271 |

OTHER PUBLICATIONS

Research Product Data Sheet, Shell Chemical Company (050996–01) Kraton® Polymer Research Product TKG–102.
Research Product Data Sheet, Shell Chemical Company (110493–2) Kraton® Polymer Research Product TKG–101.
Article: *Versatile, High Performance TPE for Adhesives*, by: Glenn R. Himes & Linda H. Oliveri, from 1997 Hot Melt Symposium, TAPPI Proceedings, pp. 87–107.

*Primary Examiner*—Christopher Henderson
*Attorney, Agent, or Firm*—Nancy N. Quan; Carolyn A. Fischer

[57] ABSTRACT

The present invention is a hot melt pressure sensitive adhesive comprising a block copolymer structure having an A—B—A backbone block copolymer having B or C blocks attached to the backbone, wherein the A—B—A block backbone is saturated and the B or C block is of the same composition or of a different composition than the midblock of the backbone.

9 Claims, 2 Drawing Sheets

PRESSURE SENSITIVE ADHESIVE COMPRISING SATURATED BACKBONE HAVING SIDE CHAINS

FIELD OF THE INVENTION

This invention relates to hot melt adhesives comprising block copolymers having a substantially saturated A—B—A block backbone in combination with B or C blocks attached to the backbone wherein the solution viscosity of the block copolymer is greater than about 400 cPs for a 20% by weight solution in toluene. This invention particularly relates to improved pressure sensitive adhesive formulations useful in the manufacturing of disposable articles such as disposable diapers, sanitary napkins, bed pads, incontinent pads, surgical drapes, surgical gowns and medical devices. The adhesives of the invention may be used to construct such articles or preferably, as a positioning adhesive, where an adhesive layer is used to attach a disposable article such as a sanitary napkin to fabric or a medical device to skin. Additionally, the adhesives of the present invention are useful in a variety of tape and label applications, particularly those applications where reduced oil staining tendencies, high tack, and/or low viscosity are advantageous adhesive properties.

BACKGROUND OF THE INVENTION

Hot melt adhesives comprising block copolymers are commonly used for pressure sensitive adhesives (PSA's) for use as construction and positioning adhesives for disposable articles as well as for a variety of pressure sensitive tapes and labels.

U.S. Pat. No. 5,393,841 issued to Himes et al. Feb. 28, 1995 teaches dissimilar arm asymmetric radial or star block copolymers for adhesive and sealants. Exemplified are block copolymers having side chains of polyisoprene (2 and 4, respectively) and a saturated main chain of poly (ethylene/butylene) terminated with polystyrene blocks having a solution viscosity (20% wt. in toluene) of 180 cps and 93 cps. Such block copolymer structures having a solution viscosity of 180 cps became commercially available as Kraton® TKG-101.

Prior to the invention of such novel polymer structures, if one sought a heat stable adhesive, a saturated block copolymer such as an SEBS or SEPS block copolymer would be preferred. However, an adhesive requiring high tack would typically comprise SIS or SBS block copolymer composition. A mixture of these block copolymers does not produce an adhesive having both high tack and excellent heat stability. One would expect the adhesive properties of the present A—B—A, block copolymer having B or C blocks attached to the backbone, to be intermediate between a saturated A—B—A block copolymer and a second block copolymer structure similar in composition to the C block. For example, a block copolymer having an SEBS backbone with isoprene blocks attached to the midblock would be expected to exhibit similar properties to a blend of SEBS and SIS. Surprisingly, this new structure offers the advantages of both block copolymer structures without compromising the advantages of one structure over the other. Furthermore, it allows for block copolymer combinations that would phase separate if combined by traditional blending techniques.

WO 95/30721 published Nov. 16, 1995, incorporated herein by reference, discloses adhesive compositions comprising a block copolymer structure having a substantially saturated A—B—A backbone with B or C blocks attached to the backbone. Exemplified are construction adhesives comprising about 25% by weight of Kraton® TKG-101. Also exemplified is a positioning adhesive comprising a blend of 9.2 wt-% of Kraton® TKG-101 in combination with 6.1 wt-% of a conventional block copolymer.

SUMMARY OF THE INVENTION

The present invention is directed to adhesive compositions comprising block copolymer structures having a substantially saturated A—B—A backbone with B or C blocks attached to the backbone wherein the novel block copolymer structures have a specific solution viscosity. The adhesive compositions exhibit high cohesive strength and are useful in a variety of applications such as positioning adhesives and tapes, in the absence of a second block copolymer. Surprisingly, by employing such block polymers having a solution viscosity greater than about 400 cPs, the adhesive transfer tendencies, and/or plasticizer staining tendencies are minimized, and in some instances eliminated, without sacrificing the improvement in peel adhesion values. Further, such block copolymer structures may be used at relatively low polymer concentrations while maintaining such improved properties. Accordingly, the present invention is directed toward an improved hot melt pressure sensitive adhesive composition comprising about 10 wt-% to about 45 wt-% of a substantially saturated A—B—A block copolymer having B or C block attached to the backbone wherein the solution viscosity of the block copolymer is greater than about 400 cPs; about 10% by weight to about 50% by weight of a plasticizer; and 0% by weight to about 65% by weight of a tackifying agent.

DETAILED DESCRIPTION OF THE INVENTION

Figure 1:
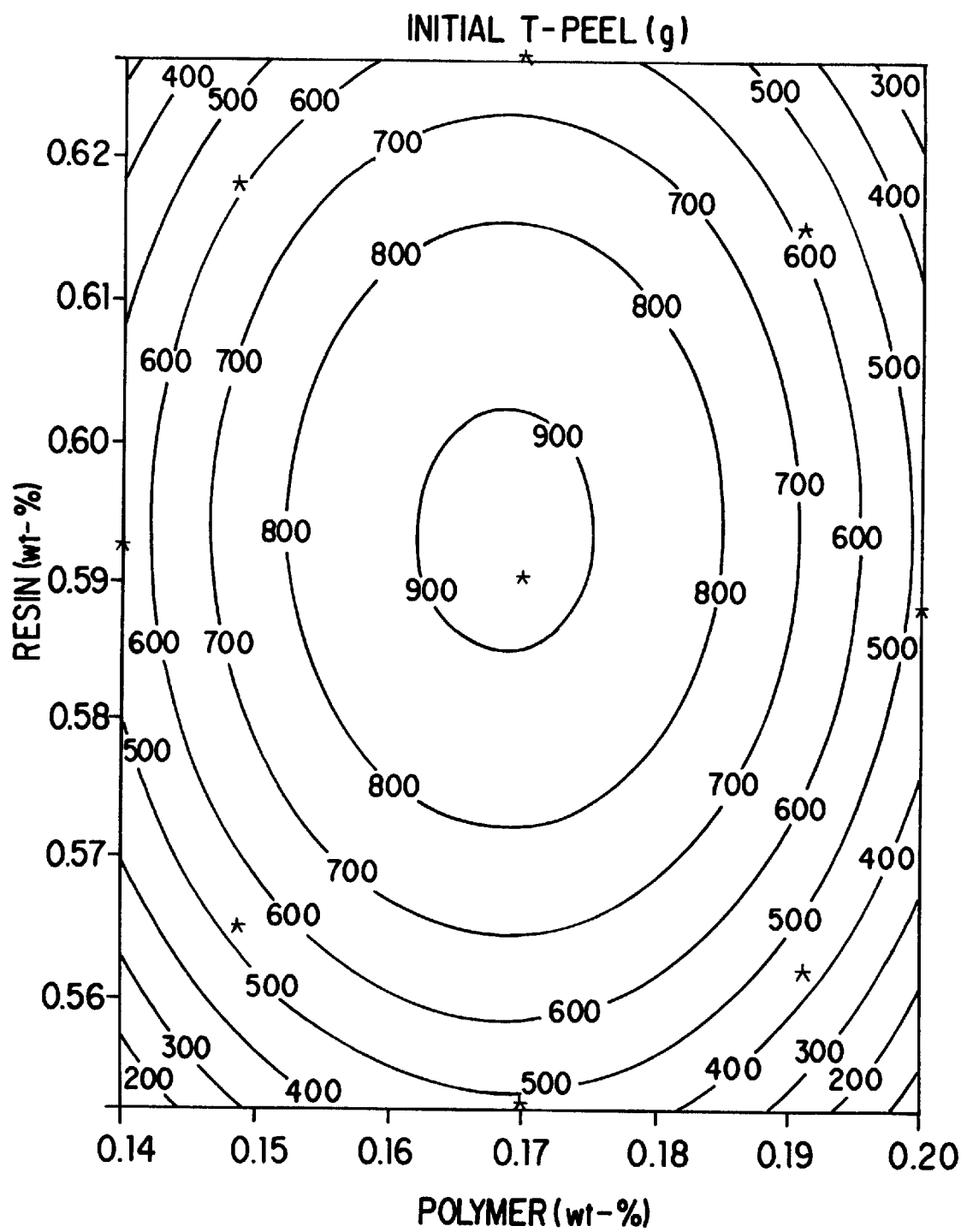

The present invention is a hot melt pressure sensitive adhesive comprising a block copolymer structure having an A—B—A backbone block copolymer having B or C blocks attached to the backbone, wherein the A—B—A block backbone is saturated and the B or C block is of the same composition or of a different composition than the midblock of the backbone.

The A blocks are polymer blocks of a vinyl aromatic hydrocarbon. Preferably, the vinyl aromatic hydrocarbon is styrene. Other useful vinyl aromatic hydrocarbons include alphamethyl styrene, various alky-substituted styrenes, alkoxy-substituted styrenes, vinyl naphthalene, vinyl toluene and the like.

The B or C block is an unhydrogenated or hydrogenated conjugated diene. Preferred hydrogenated B or C blocks include ethylene-propylene or ethylene-butylene (hydrogenated butadiene) and mixtures thereof, whereas preferred unhydrogenated B or C blocks include isoprene, butadiene, and mixtures thereof. Isoprene is a particularly preferred unhydrogenated block. Other dienes which also may be useful include piperylene, methylpentadiene, phenylbutadiene, 3,4-dimethyl-1,3-hexadiene, 4,5-diethyl-1,3-octadiene and the like, preferably conjugated dienes containing 4 to 8 carbon atoms.

Block copolymers having this unique structure are available from Shell Chemical Company, Houston, Tex. under the tradenames Kraton® TKG-101, Kraton® TKG-102 and Kraton® RP-6912. Kraton® TKG-101 and Kraton® TKG-102 have a styrene-ethylene/butylene-styrene (SEBS) backbone with isoprene blocks attached to the midblock of the backbone, while Kraton® RP-6912 has an styrene-ethylene/propylene-styrene (SEPS) backbone with an ethylene-propylene block attached to the styrene endblock. A saturated backbone in combination with unsaturated blocks attached to the backbone provides a polymer structure exhibiting unique advantages over existing block copolymer based pressure sensitive adhesive technologies. More detailed information concerning these polymers is depicted below in Tables 1A and 1B. It is surmised that since the B or C blocks attached to the backbone are not involved in the formation of styrene domains, and therefore, pressure sensitive adhesives comprising this polymer base exhibit improved tack without compromising heat stability.

TABLE 1A

Typical properties of Kraton ® TKG-101

| Property | Typical Value |
| --- | --- |
| Styrene Content, % | 18 |
| Isoprene Content, % | 34 |
| Ethylene-Butylene Content, % | 48 |
| Melt Viscosity @ 350° F., cps | 1,570 |
| Solution Viscosity, cps | 180 |

TABLE 1B

Typical properties of Kraton ® TKG-102

| Property | Typical Value |
| --- | --- |
| Styrene Content, % | 18 |
| Isoprene Content, % | 36 |
| Ethylene-Butylene Content, % | 46 |
| Melt Viscosity @ 350° F., cps | 9,240 |
| Solution Viscosity, cps | 600 |

This uniquely structured polymer is the major polymer component of the adhesive of this invention. Preferably, this polymer is present in an amount of about 10 wt-% to about 45 wt-%, preferably in an amount of about 10 wt-% to about 30 wt-% and more preferably in an amount of about 10 wt-% to about 25 wt-% and most preferably in an amount from about 15 wt-% to about 25 wt-%. In comparison to the Kraton® TKG-101, the Kraton® TKG-102 may be employed at relatively low concentrations in the absence of a second reinforcing block copolymer, exhibiting high cohesive strength in combination with high peel adhesion values.

The present inventors have found that by employing block copolymers having A—B—A backbone block copolymer having B or C blocks attached to the backbone wherein the solution viscosity of the block copolymer is greater than about 400 cPs, the resulting adhesive compositions exhibit a significant improvement with respect to similar block copolymer structures having a different solution viscosity (TKG-101 having a solution viscosity of about 200 cPs). Unexpectedly, upon employing such block copolymers having a substantially higher solution viscosity the cohesive strength and staining resistance is increased and transfer tendencies reduced without sacrificing the peel strength.

The block copolymers having an A—B—A block copolymer backbone and B or C blocks attached to the backbone useful herein include those having a solution viscosity for a 20 wt-% solution in toluene of at least about 400 cPs, preferably greater than about 500 cPs, more preferably greater than about 600 cPs. The applicants surmise that block copolymers having this novel structure ranging in solution viscosity from about 650 cPs to as much as about 1000 cPs would be useful in improved pressure sensitive adhesive compositions at concentrations ranging from about 10 wt-% to about 15 wt-%.

The block copolymers having an A—B—A block copolymer backbone and B or C blocks attached to the backbone may also be characterized with respect to molecular weight (Mw and/or Mn). Accordingly, the block copolymers useful in the invention have a weight average molecular weight greater than about 140,000, preferably greater than about 150,000, more preferably greater than about 160,000 and most preferably greater than about 170,000.

As used herein, the term "tackifier" means any of the compositions described below which are useful to impart tack to the hot melt adhesive composition. ASTM D-1878-61T defines tack as "the property of a material which enables it to form a bond of measurable strength immediately on contact with another surface".

The adhesive of the invention will comprise from 0 to about 65 wt-% of a tackifying resin. Typically, the adhesives will comprise from about 20 wt-% to about 65 wt-%, preferably from about 30 wt-% to about 60 wt-% and more preferably from about 40 wt-% to about 60 wt-% of a tackifier. However, in some instances, such as for skin attachment adhesives, a blend of the novel block copolymer having a solution viscosity greater than about 500 cPs in combination with a liquid plasticizer alone in the absence of a plasticizer, may exhibit sufficient tack and adhesion properties.

In general terms, the tackifying resins useful in the adhesives of the invention comprise resins derived from renewable resources such as rosin derivatives including wood rosin, tall oil, gum rosin; rosin esters, natural and synthetic terpenes, and derivatives of such. Aliphatic, aromatic or mixed aliphatic-aromatic petroleum based tackifiers are also useful in the adhesives of this invention. Representative examples of useful hydrocarbon resins include alpha-methyl styrene resins, polyphenylene ether, branched and unbranched $C_5$ resins, $C_9$ resins, $C_{10}$ resins, as well as styrenic and hydrogenated modifications of such. Tackifying resins range from being a liquid at 37° C. to having a ring and ball softening point of about 135° C. Solid tackifying resins with a softening point greater than about 100° C., more preferably with a softening point greater than about 130° C. are particularly useful to improve the cohesive strength of the adhesives of the present invention. For the adhesives of the invention, the preferred tackifying resin is predominantly aliphatic. However, tackifying resins with increasing aromatic character are also useful, particularly when a second tackifier or mutually compatible plasticizer is employed.

Commercially available tackifying resins useful for the present invention include Eastotac H series resins available from Eastman Chemical Company, Kingsport, Tenn.; Wingtack resins available from Goodyear, Akron, Ohio; Zonatac resins available from Arizona Chemical Company, Panama City, Fla.; and Escorez® 5300 and 5400 series resins available from Exxon Chemical, Houston, Tex. End block resins such as Kristalex® resins available from Hercules, Wilmington, Del., are also preferred.

A plasticizer is broadly defined as a typically organic composition that can be added to thermoplastics, rubbers and other resins to improve extrudability, flexibility, workability or stretchability. In preferred embodiments of the invention, the plasticizer will be provided to the adhesive in amounts up to about 50 wt-%, preferably ranging from about 10 wt-% to about 30 wt-% of the adhesive. The plasticizer may be either a liquid or a solid at ambient temperature. Exemplary liquid plasticizers include hydrocarbon oils, polybutene, liquid tackifying resins, and liquid elastomers.

Plasticizer oils are primarily hydrocarbon oils which are low in aromatic content and which are paraffinic or napthenic in character. Plasticizer oils are preferably low in volatility, transparent and have as little color and odor as possible. Paraffinic oils, including Kaydol oil commercially available from Witco, are preferred. However, 1200 and 500 grade napthenic oils, such as those available from Penzoil may also be employed. The use of plasticizers in this invention also contemplates the use of olefin oligomers, low molecular weight polymers, vegetable oils and their derivatives and similar plasticizing liquids.

When a solid plasticizing agent is employed, it will preferably have a softening point above 60° C. It is believed that by combining the novel block copolymer structure and a solid plasticizer such as a cyclohexane dimethanol dibenzoate plasticizer, the resulting adhesive composition may be applied at temperatures below 120° C., preferably below 100° C. Although a 1,4-cyclohexane dimethanol dibenzoate compound commercially available from Velsicol under the trade name Benzoflex™ 352 is exemplified, any solid plasticizer that will subsequently recrystallize in the compounded thermoplastic composition is suitable. Adhesive compositions comprising solid plasticizers, particularly a cyclohexane dimethanol dibenzoate plasticizer are described in EP 0422 108 B1 and EP 0 410 412 B1, both assigned to H. B. Fuller Company.

As is known is the art, various other components can be added to modify the tack, color, odor, etc. of a hot melt adhesive. Antioxidants such as Irganox® 1076 and 1010 and other stabilizing ingredients can also be added to protect the adhesive from degradation induced by various heat and lights.

The resulting inventive adhesive composition is characterized by having high peel values and excellent thermal stability. The peel values are in excess of 500 g/linear inch width for a 2 mil slot coating, preferably in excess of about 600 g, more preferably greater than about 700 g, and most preferably greater than about 800 g. High peel values are amenable to lower adhesive coating thicknesses, which results in a significant cost savings to the end-user. For example, an 800 g peel for a 2 mil (50 gsm) coating typically results in about a 400 g peel for a 1 mil (25 gsm) coating.

The adhesives of the present invention are also characterized as being free of adhesive residue and adhesive transfer, and exhibiting low staining tendencies. The applicants surmise that the staining may be completely eliminated by employing a higher molecular weight and/or a higher concentration of the block copolymer. These properties are of particular importance for removable PSA's such as positioning adhesives for feminine napkins, skin attachment adhesives for medical devices, and various removable labels and decals.

The adhesive of the present invention may also be characterized as having a little change in peel adhesion under low stress conditions. This characteristic is evident by the difference in values between the Initial T-peel to Cotton and the Delayed T-peel to Cotton. Preferably, the difference between the values obtained on these tests divided by the value of the Initial T-peel to Cotton has an absolute value of less than about 30%, more preferably less than about 20% and most preferably less than about 10%. This is particularly important for feminine napkins and medical devices to insure the articles do not come prematurely unattached, nor exhibit an excessive removal force when intentionally removed.

Depending on the amount and Mw of the block copolymer employed, the adhesive may also be characterized as having a low viscosity. Preferably, the viscosity is less than about 12,000 cPs at 135° C. (275° F.), preferably less than about 10,000 cPs, more preferably less than about 8,000 cPs and most preferably less than about 6,000 cPs. This characteristic allows such adhesive compositions to be amenable to a variety of application techniques including slot-coating, spiral-spray, melt-blown and particularly, gravure coating and screen printing wherein the coating device is often directly contacted with the substrate to be coated. Due to the low viscosity, such adhesive may be applied at low application temperatures, typically less than about 149° C. (300° F.), preferably less than about 135° C. (275° F.), and more preferably at about 121° C. (250° F.) or less.

Test Methods

T-Peel Testing

This test method describes how to measure the removal force of an adhesive surface bonded to a fabric substrate.

Prepare hot melt coated adhesive films on Mylar™ or polyethylene film using a suitable coating device at an appropriate application temperature. During preparation of the adhesive film, the adhesive surface is covered with release paper to facilitate handling. The coat weight is checked with a target coat weight of 50 g/m$^2$+/−3 g/m$^2$.

Strips of test fabric are cut into 1½"×5" (3.75 cm×12.5 cm) strips. Suitable test fabrics, such as Style 437 bleached cotton T-shirt fabric and Style 332 Nylon Tricot 6, are available from Test Fabrics Inc. (Middlesex, N.J.). The adhesive coated films are cut into 1 inch (2.5 cm) strips which are 4 inches (10 cm) in machine direction. At one end of each strip, fold approximately ¼ inch (0.6 cm) of the strip onto itself creating a grip. The release paper is removed and the adhesive surface of one 1 inch (2.5 cm) wide strip is placed onto the test fabric to form a composite.

For the "Initial Peel to Cotton" test, the composite is placed on the mechanical roll-down device, and allow the roller two passes over the sample, one forward and one back. A timer is activated and the sample is placed into the jaws of the slip-peel tester or other suitable force measuring device. The inch (2.5 cm) wide strip is placed into the mobile jaw and the fabric in the stationary jaw. No more than one minute after the sample has been removed from the roll-down device, the sample is peeled at 12 inches per minute (30 cm/min), averaging over 10 seconds. The procedure is repeated five times, recording the average T-peel value and noting any legging or adhesive transfer. The T-peel values are reported in grams per lineal inch.

For the "Delayed Peel to Cotton" test, the samples are conditioned on a bench top for 105 minutes after applying pressure with the roll-down device, prior to peeling. This test is intended to predict whether the level of peel adhesion changes is a low stress environment.

In the case of the "Stressed T-peel to Nylon", a composite is formed with the adhesive coated strip and nylon test fabric. Each composite sample is sandwiched between two 3.5"×4" Plexiglas plates. Weights, preheated to 41° C. (105° F.), having a mass of 2,000 g are evenly distributed on top of the plexiglas plate. The samples are then conditioned for 45 minutes at 41° C. (105° F.). The test samples are removed from between the plates and conditioned at 21° C. (70° F.)/50% RH for 15 minutes and then peeled at 12 inches per minute (30 cm/min).

In the disposable article industry, it is preferred to have an initial T-peel to cotton in the range of about 100–500 grams per lineal inch, most preferred about 200–500 grams per lineal inch without any indication of adhesive transfer. Provided that neither residual nor adhesive transfer is evident, peel values in excess of 500 g are amenable to adhesive coat weight reductions. For example, the relationship between peel adhesion and adhesive coat weight is typically linear for most adhesive applications, particularly slot-coat. Therefore, a composition exhibiting peel adhesion values of about 800 g at a 2 mil coating thickness would be expected to exhibit peel adhesion values of about 400 g for a 1 mil coating.

Melt Viscosity is determined in accordance with the following procedure using a Brookfield Laboratories DVII+ Viscometer in disposable aluminum sample chambers. The spindle used is a SC-27 hot-melt spindle, suitable for measuring viscosities in the range of from 10 to 100,000 centipoise. The sample is placed in the chamber, which is in turn inserted into a Brookfield Thermosel and locked into place. The sample chamber has a notch on the bottom that fits the bottom of the Brookfield Thermosel to ensure that the chamber is not allowed to turn when the spindle is inserted and spinning. The sample is heated to the desired temperature, with additional sample being added until the melted sample is about 1 inch (2.5 cm) below the top of the sample chamber. The viscometer apparatus is lowered and the spindle submerged into the sample chamber.

Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

Solution Viscosity—20 wt-% is measured by dissolving 20 wt-% of the polymer in 80 wt-% of toluene. The mixture is continuously agitated for 24 hours to insure the polymer is completely dissolved. The viscosity is then measured in accordance with the melt viscosity at ambient temperature (25° C.).

Solution Viscosity—30 wt-% is measured by dissolving 20 wt-% of the polymer in 80 wt-% of toluene. The mixture is continuously agitated for 24 hours to insure the polymer is completely dissolved. The viscosity is then measured in accordance with the melt viscosity at ambient temperature (25° C.). The solution viscosity was measured at two different polymer concentrations in view of the fact that the values reported for 20 wt-% are approaching the detection limit of the instrument. Accordingly, by increasing the polymer concentration the values are well within the capabilities of the instrument.

Staining is determined by preparing adhesive coated Mylar™ films cast from a 1:1 solution of adhesive and toluene at a target coat weight of 50 g/m²+/−3 g/m². An adhesive composition of 15 wt-% polymer, 30 wt-% 500 napthenic oil, and 55 wt-% resin was employed to compare the various grades of the novel block copolymer. After the solvent is allowed to evaporate for at least 24 hours the adhesive coated surface is covered with release paper to facilitate handling. The adhesive coated film is cut into 1" (2.5 cm) strips approximately 8 inches (20 cm) in length. The release paper is removed and the adhesive surface is placed in contact with high-speed xerographic copy paper. A 4.5 lb. roller is passed over the strip to insure consistent contact with the paper. The sheet of paper with the adhered samples is placed in a 49° C. (120° F.) oven for 96 hours. The samples are then removed and the side of paper opposite the samples is observed for evidence of staining.

Staining Characterization

7—severe—Outline of adhesive strip clearly visible. Paper is darkened and transparent throughout the length and width of the test strip.

5—moderate—Outline of adhesive strip not clearly visible. Darkening of paper has "blotchy" appearance.

2—little staining—Outline of adhesive strip barely visible. Faint darkening of paper.

0—no staining—Back side of paper looks identical to paper not subjected to the staining test.

TABLE II

Block Copolymer Characteristics

| | Solution Viscosity | Solution Viscosity | Staining | Mw | Mn |
|---|---|---|---|---|---|
| TKG-101 | 210 | 1800 | 6 | 123,000 | 105,000 |
| Polymer 1 | 540 | 9400 | | 142,000 | 120,000 |
| Polymer 2 | 480 | 5500 | 5 | 145,000 | 128,000 |
| Polymer 3 | 630 | 13200 | 3 | 171,000 | 145,000 |
| 50/50 blend - Polymer 2/Polymer 3 | 600 | | 4–5 | | |

Table II depicts the physical properties of the block copolymer structures having an A—B—A backbone with C side chains employed in the examples.

TABLE III

Comparative Examples

| Ingredient wt-% | Comparative A | Comparative B | Comparative C |
|---|---|---|---|
| TKG-101 | | | 23.1 |
| Kraton G-1657 | 17 | | |
| Kraton G-1652 | | 17 | |
| 1200 Oil | | | 19.6 |
| Kaydol Oil | 21.6 | 21.6 | |
| Wingtack Plus | | | 47.1 |
| Kristalex 3100 | | | 9.8 |
| Escorez 5400 | 59.2 | 59.2 | |
| Irganox 1076 | | | 0.2 |
| Irganox 1010 | 0.2 | 0.2 | 0.2 |
| Viscosity @ 275 F. | 9750 | 4912 | |
| Viscosity @ 300 F. | 5450 | 2530 | |
| Initial to Cotton Average | 589 (13) | 336 (44) | 848 (40) |
| Transfer | No transfer | No transfer | Slight Residue |
| Stressed to Nylon Average | 1319 (282) | 294 (60) | 661 (93) |
| Transfer | Adhesive Transfer | No transfer | Residue |

Table III depicts Comparative Examples A–C. Comparative C of Table III exemplifies an adhesive composition made with a block copolymer structure having an A—B—A backbone with C side chains attached to the backbone. Specifically, Kraton® TKG-101 was employed, a block copolymer having an S—EB—S backbone with isoprene side chains having a solution viscosity of about 200 cPs. At a concentration of 23.1 wt-% in combination with tackifier and plasticizer, the resulting adhesive composition exhibits residue for both the Initial T-peel to Cotton and the Stressed T-peel to Nylon tests.

Comparatives A and B exemplify adhesive compositions identical in concentration of block copolymer, tackifier, and plasticizer to the inventive adhesive compositions with the exception that conventional substantially saturated block copolymers lacking B or C side chains are employed. Comparative B employs Kraton® G-1652, an S—EB—S block copolymer that is amenable to low viscosity adhesive compositions. However, by employing such, acceptable peel adhesion values can only be attained for a coating thickness of 2 mils (50 grams/square meter). Comparative A employs a high diblock block copolymer amenable to high tack adhesive formulation, Kraton® G-1657. However, by employing such, the viscosity of the resulting adhesive composition is twice as high as Comparative B and the adhesive of the present invention. Further, although the Initial Peel to Cotton values are desirable, the Stressed T-peel to nylon results in adhesive transfer.

Thus, achieving an adhesive composition having excellent thermal stability, low viscosity, in combination with high peel values has been difficult to attain.

TABLE IV

| | | Inventive Examples | | | | | |
|---|---|---|---|---|---|---|---|
| Ingredient wt-% | Comparative D | Example 1 | Example 2 | Example 3 | Example 4 | Example 5 | Example 6 |
| TKG-101 | 17 | | | | | | |
| Polymer 1 | | 17 | | | 20 | | |
| Polymer 2 | | | 17 | | | | 8.5 |
| Polymer 3 | | | | 17 | | 12 | 8.5 |
| Kaydol Oil | 21.6 | 21.6 | 21.6 | 21.6 | 20.1 | 23.6 | 21.6 |
| Escorez 5400 | 59.2 | 59.2 | 59.2 | 59.2 | 57.7 | 62.2 | 59.2 |
| Irganox 1010 | 0.2 | 0.2 | 0.2 | 0.2 | 0.2 | 0.2 | 0.2 |
| Viscosity @ 275 F. | 2500 | 5375 | 4450 | 6150 | 11825 | 2595 | 5025 |
| Viscosity @ 300 F. | 1440 | 2890 | 2455 | 3325 | 5637 | 1458 | 2820 |
| Initial to Cotton | | | | | | | |
| Average Transfer | 918 (23) Residue | 930 (24) Slight Residue | 859 (47) No transfer | 805 (63) No transfer | 638 (12) No transfer | 925 (28) Residue | 864 (29) No transfer |
| Stressed to Nylon | | | | | | | |
| Average Transfer | 611 (66) Residue | 637 (109) Residue | 608 (73) Residue | 534 (58) No transfer | 455 (62) No transfer | 613 (68) Residue | 549 (112) Slight Residue |
| Delayed to Cotton | | | | | | | |
| Average Transfer | | | | 671 (47) No transfer | 653 (25) No transfer | | 787 (37) No transfer |

Comparative D exemplifies another adhesive composition employing a block copolymer having an A—B—A backbone having B or C side chains. Consistent with Comparative C, residual adhesive transfer is evident for both the Initial T-peel to Cotton and the Stressed T-peel to Nylon tests. Example 3 exemplifies an adhesive composition of the present invention employing 17 wt-% of a block copolymer having an A—B—A backbone having B or C side chains. The average Initial T-peel to Cotton value is in excess of 800 g and no transfer is exhibited on all three tests. The solution viscosity of the novel block copolymer structure employed was 630 cPs. Example 4 employs a slightly higher concentration of the novel block copolymer structure wherein the block copolymer has a slightly lower solution viscosity than that of Example 3. In doing so, the Initial T-peel to Cotton remains substantially higher than the prior art, yet is diminished with respect to Example 4. Further, the Initial T-peel to Cotton and Delayed T-peel to Cotton are approximately equal, meaning the peel adhesion does not change in this time frame. The applicants surmise that similar results would be obtained by employing, for example, Polymer 2, having a solution viscosity of 480 cPs, at a concentration ranging from about 20 wt-% to about 25 wt-%. Example 6 exemplifies blending block copolymer structures having an A—B—A backbone with C side chains with each other. The peel adhesion results demonstrate the criticality of the solution viscosity being greater than about 600 cPs for adhesive compositions comprising less than about 20 wt-% polymer. Example 5 exemplifies that in order to employ the block copolymer at concentrations less than about 15 wt-%, for example 12 wt-%, the solution viscosity of the block copolymer must be greater than that of lot #PP 5745. The applicants surmise that block copolymer having a solution viscosity ranging from about 650 cPs to perhaps as high as 1000 cPs would be useful for adhesive compositions employing less than 15 wt-% block copolymer, particularly in the range from about 10 wt-% up to about 15 wt-%.

An experimental design was run employing a block copolymer having an S—EB—S backbone with isoprene side chains attached to the backbone having a solution viscosity of 540 cPs, in combination with Escorez 5400, and Kaydol oil. FIG. 1 depicts a contour-plot of the Initial T-peel for a 2 mil film. At a block copolymer concentration of 17 wt-% and a resin concentration ranging from about 58.5 wt-% to about 60.5 wt-% with the remainder comprising oil, a T-peel maximum is attained. It is preferred to maximize the T-peel values. As discussed previously, T-peel values in excess of 500 g permit the reduction of adhesive coat weights.

Figure 2:
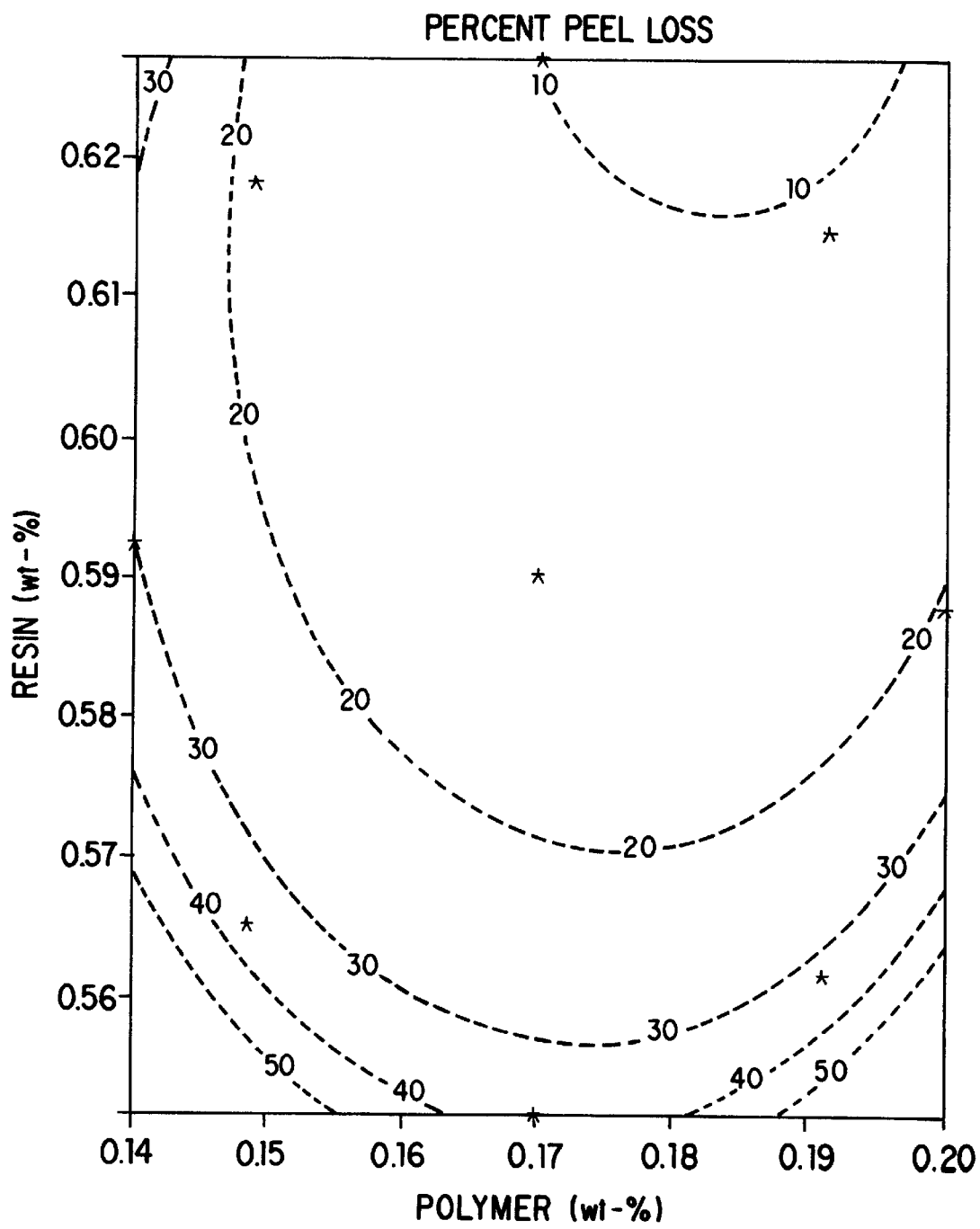

FIG. 2 depicts the "Percent Peel Loss" after 2 hours. The values modeled are obtained by subtracting the Delayed T-peel value from the Initial T-peel values and dividing the difference by the Initial T-peel for each data point. The inventive adhesive compositions of the present invention are advantageous in that in the area of maximum peel, as depicted in FIG. 1, the adhesive composition also exhibits a minimal peel loss. A minimal peel loss is indicative of maintaining adhesion under low stress conditions. It is surmised that the polymer chains are stretched to some extent upon applying pressure to the adhesive, such as is applied when the adhesive is adhered to a surface. Over time the polymer chains retract, resulting in the adhesive having reduced adhesive strength. A pressure sensitive adhesive comprising a block copolymer which is not elastomeric, typically has poor cohesive strength. It is surprisingly that by employing a block copolymer having a substantially saturated A—B—A backbone in combination with unsaturated side chains, the resulting adhesive has sufficient cohesive strength and minimal peel loss.

What is claimed is:

1. A hot melt pressure sensitive adhesive composition consisting essentially thereof:
   a) from about 10 wt-% to about 30 wt-% of at least one block copolymer having a substantially saturated A—B—A block copolymer backbone, where B is substantially saturated, said block copolymer comprising C blocks attached to the backbone, where C is substantially unsaturated, and, optionally, B blocks attached to the backbone, wherein said block copolymer has a solution viscosity of greater than about 400 cPs at 20% by weight;
   b) from about 10% by weight to about 50% by weight of a plasticizer comprising oil; and
   c) up to about 65% by weight of a solid tackifying agent; wherein said adhesive composition exhibits an initial T-peel to cotton of greater than about 600 g for a 50 grams/m$^2$ coat weight and is free of adhesive residue.

2. A hot melt pressure sensitive adhesive composition comprising:
   a) from about 10 wt-% to about 45 wt-% of at least one block copolymer having a substantially saturated A—B—A block copolymer backbone, where R is substantially saturated, said clock copolymer comprising C blocks attached to the backbone, wherein C is substantially unsaturated, and, optionally, B blocks attached to the backbone, wherein said block copolymer has a solution viscosity of greater than about 600 cPs at 20% by weight;
   b) from about 10% by weight to about 50% by weight of a plasticizer comprising oil; and
   c) up to about 65% by weight of a solid tackifying agent.

3. The adhesive composition of claim 2 wherein said block copolymer concentration ranges form about 10 wt-% to about 20 wt-%.

4. The adhesive composition of claim 1 wherein said C block is attached to said B midblock.

5. The adhesive composition of claim 1 wherein said adhesive is useful to construct disposable article.

6. The adhesive composition of claim 5 wherein said article is selected from the group consisting of disposable diapers, sanitary napkins, bed pads, incontinent pads, surgical drapes and medical devices.

7. The adhesive composition of claim 1 wherein said composition is useful as a positioning adhesive.

8. The adhesive composition of claim 1 wherein said composition is useful as a skin attachment adhesive.

9. The adhesive composition of claim 1 wherein said composition is useful for tape and labels.

* * * * *